2,948,613

DIAZOTYPE MATERIALS SENSITIZED WITH N-HETERO-p-AMINOBENZENEDIAZONIUM SALTS

Robert J. Cox, Chenango Bridge, and Ralph G. D. Moore, Chenango Forks, N.Y., assignors to General Aniline & Film Corporation, New York, N.Y., a corporation of Delaware No Drawing. Filed July 26, 1957, Ser. No. 674,316

5 Claims. (Cl. 96—91)

The present invention relates to diazotype materials in which the light-sensitive compound is a benzenediazonium salt containing in the para-position to the diazo group, a 1,3-oxazolidino- or oxazino group.

Light-sensitive diazotype materials are generally prepared by coating a base with a light-sensitive diazonium compound, a coupling component and sufficient acid to prevent premature reaction between the diazonium compound and the coupling component. The material is processed to form azo dye images therein by exposing the diazotype material to a pattern under ultraviolet light and causing coupling of the undecomposed diazo and coupling component in the presence of an alkali.

The requirements of the diazotype art are rather rigid, particularly with respect to the brilliance and sharpness of the image, the opacity of the image to ultraviolet light and retention of the dye density on aging of the prints. To a very great extent these factors depend upon the particular sensitizer used in forming the diazotype material. Considerable research and development work have accordingly been done in an effort to find diazonium compounds which best meet these prerequisites. Such work has led to the grant of numerous patents, including U.S.P. 2,298,444, dated October 13, 1942, which describes the use as sensitizers of diazos from p-morpholinoaniline hydrochloride.

The compounds of the above patent have been found to be quite suitable for the preparation of various diazotype materials. It has been discovered, however, that superior results, particularly from the standpoint of image density, opacity and brilliance, are obtained when employing as the sensitizer a benzenediazonium salt containing, in para-position to the diazo group, a 1,3-oxazolidino or 1,3-oxazino group.

Light-sensitive diazotype materials containing such diazo compounds as the light sensitizers constitute the purposes and objects of the present invention.

The diazonium salts, the use of which are contemplated herein, may be characterized by the following general formula:

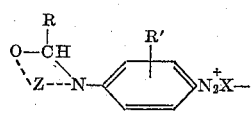

in which R is hydrogen, alkyl such as methyl, ethyl, propyl, butyl or the like, or aryl such as phenyl; Z represents the methylene groups necessary to complete a 5- or 6-membered heterocyclic ring, one of said methylene groups being substituted if desired by alkyl, such as methyl, ethyl or the like or aryl such as phenyl; R' is hydrogen, alkyl such as methyl, ethyl, or the like, aryl such as phenyl, alkoxy such as methoxy or ethoxy, or aryloxy such as phenoxy; and X is an anion such as halide, sulfate or nitrate. The above salts are usually isolated as the double salts with, for example, zinc chloride or stannic chloride.

The above compounds are prepared by reacting a p-anilinoalkanol such as 2-(p-nitroanilino)ethanol; 3-p-nitroanilino-1-propanol; 3-p-nitroanilino-2-propanol; or 2-(3-methoxy-4-nitroanilino)ethanol with an aldehyde such as formaldehyde, acetaldehyde, benzaldehyde or the like, reducing the nitro compound to the amine by catalytic hydrogenation and diazotizing the resulting amino compound.

Examples of the diazonium compounds within the ambit of the above formula which we have found suitable for use are the following:

(1)

Diazonium salt from p-oxazolidinoaniline hydrochloride (2)

Diazonium salt from p-(2-methyloxazolidino)aniline hydrochloride (3)

Diazonium salt from p-(tetrahydro-1,3-oxazino)aniline hydrochloride (4)

Diazonium salt from p-(tetrahydro-2-methyl-1,3-oxazino) aniline hydrochloride (5)

Diazonium salt from p-(4-methyl-3-oxazolidino)aniline hydrochloride (6)

Diazonium salt from p-(2-phenyloxazolidino)aniline hydrochloride (7)

Diazonium salt from p-(tetrahydro-2-phenyl-1,3-oxazino) aniline hydrochloride (8)

Diazonium salt from 2-methoxy-4-oxazolidinoaniline hydrochloride

The above diazo compounds may be applied in the usual manner to any suitable support such as paper, cloth or film, i.e., that from cellulose esters and ethers or from polymers such as polystyrene, polyethylene terephthalate or the like. Preferably they are used in the form in which they are isolated, to wit, as their double salts with zinc chloride or tin chloride.

The diazo compounds are applied with a coupling component which may be any of those usual in the so-called 2-component system. Examples of such coupling components are:

2-amino-8-naphthol-3,6-disulfonic acid
2,3-dihydroxynaphthalene-6-sulfonic acid
β-Naphthol-3,6-disulfonic acid
Phloroglucinol
m-Hydroxyphenylurea
Acetoacetanilide
Resorcinol
4,6-dichlororesorcinol
3-hydroxyphenylbiguanide, or the like.

The sensitizing solution may also contain the usual adjuvants such as metal salts for intensifying the dyestuff image, i.e., aluminum sulfate, nickel sulfate or the like, stabilizing agents such as thiourea, thiosinamine, naphthalene trisulfonic acid and the like, acids to effect retarding of pre-coupling such as citric acid, tartaric acid, boric acid and the like, and hygroscopic agents such as glycol, dextrine and the like.

The following examples will serve to further illustrate the invention, although it is understood that the invention is not restricted thereto.

*Example I*

A solution of 3.2 grams of p-oxazolidinoaniline hydrochloride in 15 ml. of hydrochloric acid (S.G. 1.19) was cooled with stirring to 0° C. and treated slowly at 0–5° C. with 4 ml. of sodium nitrite solution, 5 M. About 2 grams of solid stannic chloride pentahydrate were added and the mixture was stirred for about one-half hour. The yellow product was collected by filtration and dried. It weighed 2.5 grams, melted at 150–2° C. with decomposition, and probably had the structure

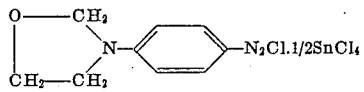

p-Oxazolidinoaniline hydrochloride was made in 74% yield by hydrogenating 3-p-nitrophenyloxazolidine in isopropyl alcohol at 3–4 atmospheres pressure over palladium on carbon catalyst, filtering off the catalyst, and passing in anhydrous hydrogen chloride. It melted over the range 174–80° C. with decomposition.

3-p-nitrophenyloxazolidine was prepared in 79% yield by digesting 5 grams of 2-(p-nitroanilino)ethanol (Kremer, J. Am. Chem. Soc. 61, 1323 (1939)) with 200 ml. formalin (40%) on the steam bath until solution was complete. The yellow needle crystals which separated on cooling were isolated as usual and weighed 4.2 grams. The melting point was 120–1° C. This method of synthesis was adapted from that described by Kon and Roberts, J. Chem. Soc. 1950, 978–82, for 3-phenyloxazolidine.

The above diazonium compound was used to prepare the following sensitizing composition:

60 parts of 2-methoxyethanol
30 parts of 2-methoxyethyl acetate
10 parts of formic acid
3 parts of sulfosalicylic acid
1.5 parts of N,N'-ethylenediacetoacetamide
1.4 parts of said diazonium salt This solution was used to coat a foil of cellulose acetate, which was then dried, exposed to actinic light under a pattern and developed by exposure to aqueous ammonia. A brilliant lemon yellow image on a clear background was obtained, the image having high dye density and excellent fastness to fading.

*Example II*

A solution of 1.2 grams of p-(tetrahydro-1,3-oxazino)-aniline hydrochloride in 2 ml. of water and 2 ml. of hydrochloric acid (S.G. 1.19) was cooled and diazotized at 0–5° C. with sodium nitrite solution, 5 M. After about 15 minutes' stirring, about 2 grams of stannic chloride pentahydrate were added and stirring and cooling were continued for about one half hour. The product, isolated by filtration and dried under reduced pressure, melted at 67–70° C. with decomposition, was sensitive to light, and coupled with phenolic compounds. It was probably a stannic chloride complex salt of p-(tetrahydro-1,3-oxazino)benzene diazonium chloride of the formula

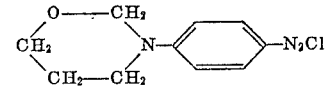

p-(Tetrahydro-1,3-oxazino)aniline was made by hydrogenating 3-p-nitrophenyltetrahydro-1,3-oxazine at 3–4 atmospheres' pressure over palladium on carbon in ethanol, removal of the catalyst, saturation of the solution with hydrogen chloride, concentration under reduced pressure, addition of a large amount of ether, and refrigeration. The product melted about 200° C. with decomposition.

3-p-nitrophenyltetrahydro-1,3-oxazine was prepared by digesting 2.5 grams of 3-p-nitroanilino - 1 - propanol (Kremer, J. Am. Chem. Soc. 61, 1323 (1939)) with 50 ml. formalin (40%) on the steam bath for several minutes. The yield of yellow product, melting at 109–10° C. after recrystallization from ethanol, was 2.5 grams or 94%.

The above diazonium salt was used in the composition of Example I in lieu of the diazo of Example I. The coupling component of the composition of Example I was replaced by acetoacetanilide.

Upon exposure and development bright yellow images on a white background were obtained with excellent resistance to fading.

*Example III*

A solution of 2.3 grams of p-(2-methyloxazolidino)-aniline hydrochloride in 8 ml. of hydrochloric acid (S.G. 1.19) was cooled with stirring to 0° C. A solution of five molar sodium nitrite was added slowly until an excess of sodium nitrite remained in the solution, following which 4.0 grams of solid stannic chloride pentahydrate dissolved in as little water as possible were added. The mixture was stirred for an additional one half hour and the product was collected by filtration after standing in the cold overnight. Dried in a vacuum desiccator over sodium hydroxide it weighed 2.3 grams, melted at 147° C. with decomposition, and probably had the structure:

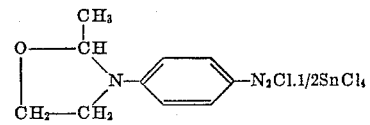

The p-(2-methyloxazolidino)aniline hydrochloride was obtained in 90% yield from 2-methyl-3-p-nitrophenyl-oxazolidine by reduction with hydrogen at 3–4 atmospheres' pressure over a palladium on carbon catalyst. After filtration of the catalyst and treatment with anhydrous hydrogen chloride, the product, melting at 186° C. with decomposition, was isolated as usual.

The 2-methyl-3-p-nitrophenyloxazolidine was prepared by heating 15 grams of 2-(p-nitroanilino)ethanol (Kremer, J. Am. Chem. Soc. 61, 1323 (1939)) on a steam bath with 75 ml. of acetaldehyde and 75 ml. of water for 15 minutes. The mixture was cooled quickly and triturated in a blender with water. After standing overnight in the cold, the precipitate was filtered and dried. Recrystallization first from isopropyl alcohol and then from water gave 2.5 grams of a product melting at 106–8° C. This preparation was adapted from a method by Kon and Roberts (J. Am. Chem. Soc. 1950, 978–82) for the preparation of 3-phenyloxazolidine.

The above diazo was used in the composition of Example I in lieu of the diazo of Example I. The coupling component of Example I was replaced by an equivalent quantity of N-benzylacetoacetamide.

The composition was coated on a transparent base and dried. Upon exposure beneath a pattern and development, images were obtained of an attractive yellow hue which were excellently suited for use in projection viewing.

It is believed to be evident that compounds 4 to 8 inclusive are prepared in a manner similar to that described in the specific examples. For instance, compound 4 is obtained by the reaction of 3-p-nitroanilino-1-propanol with acetaldehyde, reduction of the nitro group to the amino group and diazotization of the resulting amine.

Compound 5 was prepared by condensing 3-p-nitroanilino-2-propanol with formaldehyde, reducing the nitro group and diazotizing the resulting compound.

Compound 6 was prepared by reacting 2-(p-nitroanilino)-ethanol with benzaldehyde, reducing the nitro group to the amino group and diazotizing the resulting amine.

Compound 7 was prepared by reacting 3-p-nitroanilino-1-propanol with benzaldehyde, reducing the nitro group to an amino group and diazotizing the resulting amine.

Compound 8 was prepared by reacting 2-(3-methoxy-4-nitroanilino)ethanol with formaldehyde, reducing the nitro group to an amino group and diazotizing the resulting amino compound.

We claim:
1. Light-sensitive diazotype material comprising a base coated with a coupling component and, as the light-sensitive diazonium compound, a compound of the following formula:

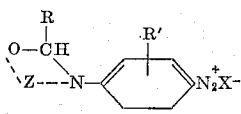

in which R is selected from the class consisting of hydrogen, alkyl and aryl; Z represents the methylene groups necessary to complete a ring system selected from the class consisting of 5- and 6-membered heterocyclic ring systems; R' is selected from the class consisting of hydrogen, alkyl, aryl, alkoxy, and aryloxy; and X is an anion.

2. The article as defined in claim 1 wherein a methylene group in the value for Z is substituted by a radical selected from the class consisting of alkyl and aryl.

3. The article as defined in claim 1 wherein the light-sensitive diazonium compound has the following formula:

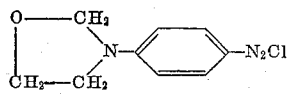

4. The article as defined in claim 1 wherein the light-sensitive diazonium compound has the following formula:

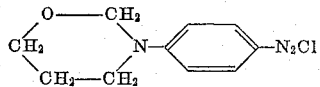

5. The article as defined in claim 1 wherein the light-sensitive diazonium salt has the following formula:

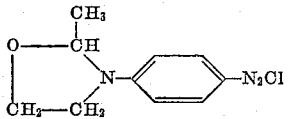

References Cited in the file of this patent

UNITED STATES PATENTS 2,298,444    Weissberger et al. _____ Oct. 13, 1942